United States Patent [19]
Kajiwara et al.

[11] Patent Number: 5,304,912
[45] Date of Patent: Apr. 19, 1994

[54] CONTROL APPARATUS FOR INDUCTION MOTOR

[75] Inventors: Kenzo Kajiwara, Hitachi; Hiroshi Hamano, Katsuta; Hirohisa Yamamura, Hitachiota; Ryoso Masaki, Hitachi, all of Japan

[73] Assignee: Hitachi, Ltd., Tokyo, Japan

[21] Appl. No.: 947,480

[22] Filed: Sep. 21, 1992

[30] Foreign Application Priority Data

Sep. 21, 1991 [JP] Japan ................... 3-268167

[51] Int. Cl.⁵ ................ H02P 1/30; H02H 5/04
[52] U.S. Cl. ................... 318/802; 318/807; 361/23
[58] Field of Search ........... 318/798, 791, 800, 801, 318/802, 803, 805, 806, 807, 808; 361/23, 51

[56] References Cited

U.S. PATENT DOCUMENTS

| | | | |
|---|---|---|---|
| 4,719,995 | 1/1988 | Ikejima | 318/806 |
| 4,862,393 | 8/1989 | Nomura | 318/802 |
| 5,047,704 | 9/1991 | Yamauchi | 318/801 |
| 5,099,186 | 3/1992 | Ripp et al. | 318/803 |

FOREIGN PATENT DOCUMENTS

| | | |
|---|---|---|
| 56-66101 | 6/1981 | Japan . |
| 57-177203 | 10/1982 | Japan . |
| 63-87192 | 4/1988 | Japan . |
| 2-197284 | 8/1990 | Japan . |

*Primary Examiner*—William M. Shoop, Jr.
*Assistant Examiner*—John W. Cabeca
*Attorney, Agent, or Firm*—Evenson, McKeown, Edwards & Lenahan

[57] ABSTRACT

A control apparatus for an induction motor and an electric car propelling motor includes an inverter for supplying a driving current to the induction motor on the basis of a predetermined control signal, a rotational speed sensor for detecting a rotational speed of the induction motor, a V/f control circuit responsive to an input speed command signal for producing a control signal for the inverter, a vector control circuit for producing an inverter control signal on the basis of the speed command signal and the rotational speed signal of the rotational speed sensor, an abnormality detecting circuit for detecting abnormality of the rotational speed sensor. A change-over circuit having inputs supplied with outputs of the V/f control circuit and the vector control circuit, respectively, selects the inverter control signal from the V/f control circuit in response to detection of abnormality of the rotational speed sensor while selecting the inverter control signal supplied from the vector control circuit so long as no abnormality is detected in the rotational speed sensor.

14 Claims, 5 Drawing Sheets

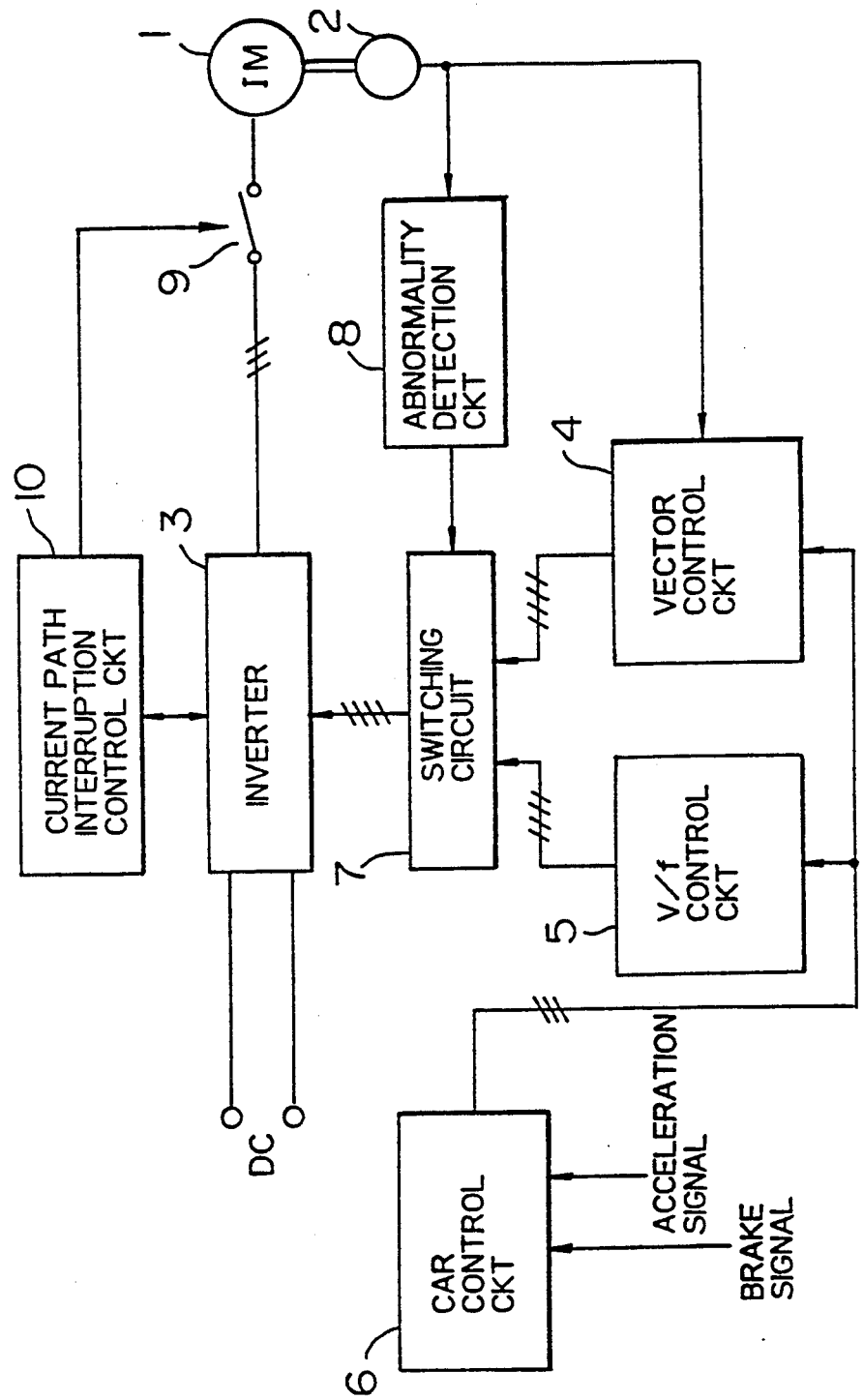

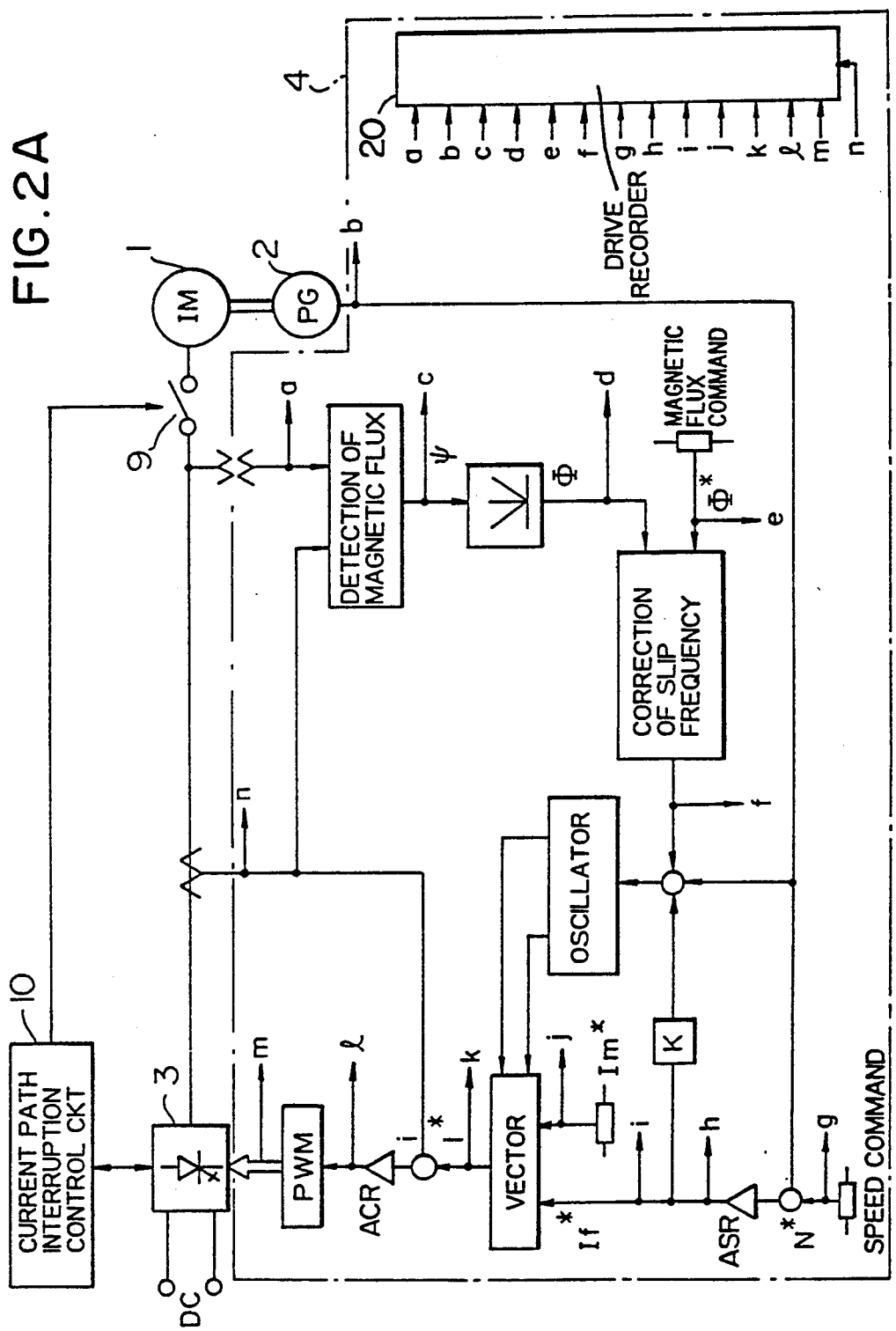

CONTROL APPARATUS FOR INDUCTION MOTOR

BACKGROUND OF THE INVENTION

The present invention relates generally to a control apparatus for an induction motor. More specifically, the invention is concerned with an induction motor control apparatus suited profitably for controlling an onboard induction motor installed on an electric motor vehicle or car as a prime mover.

In order to ensure high operation performance and high speed for an electric car, not only independent driving of individual wheels is required but also a driving system inclusive of an electric motor and a control apparatus therefor must necessarily be implemented with a high reliability.

Under the circumstances, there arises in these years an increasing trend of using an inverter-driven induction motor for propelling the electric car in combination with a vector control system for the induction motor with a view to allowing the car to run at a high speed while affording highly accurate controllability.

As the prior art apparatuses of this type, there may be mentioned those disclosed in JP-A-56-66101, JP-A-57-177203, JP-A-63-87192 and JP-A-2-197284.

As to the driving system for the electric car, availability of such system is demanded which is capable of stopping or parking the electric car with safety in any situation and capable of restarting the car once stopped due to a fault, since occurrence of faults is practically inevitable.

In conjunction with this, in order to realize the vector control mentioned above, use of a rotational speed sensor (which may also be termed an angular speed sensor) is indispensably required. As a consequence, occurrence of a fault in the rotational speed sensor renders the vector control impotent, which in turn results in abnormal torque generation of the induction motor, incurring a dangerous state for the running or operation of the electric car.

Besides, in conjunction with the inverter for supplying electric power to the induction motor, it is also noted that the useful life of components constituting the inverter is also intrinsically limited, giving rise to occurrence of faults unavoidably. Of course, upon occurrence of a fault in the inverter, the control system will become impotent, to thereby make the driving system uncontrollable, incurring a dangerous situation as well.

However, in the prior art control/driving systems for electric cars such as those disclosed in the above-mentioned references, no adequate consideration is paid to the possibility of occurrence of dangerous states of the electric car due to abnormality of the rotational speed sensor and that of the inverter, and thus there are a variety of problems remaining unsolved, as enumerated below.

(1) For the purpose of controlling the speed and torque with high accuracy, the vector control is carried out by utilizing feedback of the output signal of the rotational speed sensor. Thus, the use of the rotational speed sensor is indispensably required for the vector control. Accordingly, upon occurrence of a fault in the rotational speed sensor, torque of the induction motor becomes excessively large or small or torque of minus polarity may be generated, which eventually leads to such unwanted situation where the stable current-/power control is no more effective, making dangerous the operation of the electric car, presenting a serious problem.

(2) When a fault such as overcurrent, ineffectiveness of one of three output phases or the like takes place in the inverter which serves for supplying electric power to the induction motor, there may occur undesirable phenomena such as insufficiency of driving efforts or stoppage of the electric car and the like, which also leads to impotence of control/driving capabilities, incurring a dangerous running state of the electric car.

(3) Because the control system is susceptible to adverse influences of spurious signals such as external disturbance (noise), operation of the inverter is often stopped unnecessarily, giving rise to a problem that the control/driving system is lacking in reliability.

(4) In the case of a driving system for driving a plurality of individual wheels independent of one another for the purpose of realizing a highly accurate control of the car speed and the motor torque, occurrence of a fault in one of the driving systems brings about significant load unbalance relative to the other driving system or systems. Supposing, for example, that the driving power of a fault-suffering driving system becomes zero, generation of overall torque must be born by the other driving system(s). In another case where the driving power produced by one of the driving systems increases excessively, the torque produced by the other driving system will decrease. In any case, significant load unbalance prevails between or among a plurality of the driving systems, involving a problem that operation of the electric car inclusive of manipulation thereof by a steering handle becomes very dangerous.

SUMMARY OF THE INVENTION

In the light of the state of the art described above, it is therefore an object of the present invention to provide a control apparatus for a car-onboard induction motor, which apparatus is capable of suppressing generation of excessively large or small torque and current even upon occurrence of a fault in the inverter and is capable of stopping or parking the electric car with improved and enhanced safety substantially in any conceivable situation.

Another object of the present invention is to provide a control apparatus for an electric car driving induction motor which apparatus can discriminate spurious signals from intrinsic output signal of a rotational speed sensor to thereby ensure constantly a stable running state of the electric car.

A further object of the present invention is to provide a control apparatus for an electric car which apparatus can afford safe operation of the electric car even when load unbalance takes place among a plurality of driving systems.

In view of the above and other objects which will become apparent as the description proceeds, it is taught according to a first or general aspect of the present invention to change over the inverter control from a vector control mode to a V/f control (voltage/frequency-ratio constant control) mode which requires no feedback of the rotational speed signal from a rotational speed sensor when occurrence of abnormality is detected in the latter.

According to another aspect of the invention, there is provided a drive recorder for storing successively the control states of the inverter, wherein upon occurrence of abnormality in the rotational speed sensor, initial conditions for the vector control are set by using the data stored in the drive recorder to thereby continue the vector control operation without need for resorting to the use of the rotational speed sensor signal.

According to yet another aspect of the invention, it is taught that the rotational speed of the induction motor is arithmetically determined on the basis of a running speed of the electric car, to thereby allow the vector control to be continuously performed by feeding back the result of the arithmetic determination.

According to still another aspect of the invention, there is proposed a method of determining the induction motor speed from the car speed by taking into account an effective transmission ratio of a gear train coupling the output of the induction motor to a transmission of the electric car, wherein the result of the arithmetic determination is fed back so as to allow the vector control to be continued.

In this conjunction, the method of determining the induction motor rotation speed from the car speed by taking into account the reduction or transmission ratio should preferably be adopted as a back-up means for coping with occurrence of a fault in the rotational speed sensor, because this method is rather poor in accuracy because of intervention of mechanical play such as backlash as well as delay in the signal processing.

Further, it is taught according to another aspect of the invention to electrically disconnect the induction motor and the inverter from each other upon occurrence of a fault in the inverter.

According to yet another aspect of the invention, there is provided a means for deciding whether or not an erroneous operation as detected is ascribable to external disturbances such as noise. When the answer of the decision means is affirmative, the power supply to the induction motor is once interrupted and again started after lapse of a short time from the interruption.

According to a further aspect of the invention applied to a plurality of driving systems, it is proposed that upon detection of abnormality in one of the driving systems, the inverters and the induction motors of all the driving systems are once electrically disconnected and subsequently the power supply is restarted to the driving systems except for the system for which abnormality was detected.

In the vector control, the rotational speed (rpm) is detected by the rotational speed sensor, whereon vector arithmetic operation is performed by comparing the rotational speed with arithmetically determined phases of magnetic flux and a speed command value, to thereby make effective the speed control or torque control. Accordingly, the rotational speed sensor is indispensable. On the other hand, in the case of the V/f control, the speed command is determined only by setting the voltage and the frequency, whereby the rotational speed is controlled. In other words, the V/f control can be effectuated without need for use of the rotational speed sensor. Thus, according to the teaching of the invention, the speed control can remain effective even when a fault occurs in the rotational speed sensor, whereby the electric car can be stopped or parked with safety. Namely, the electric car can be parked safely by inputting a corresponding speed command to the driving system.

At that time, regenerative braking corresponding to the capacity of the inverter may be made effective by adopting an appropriate current control system to this end.

In general, with the V/f control, it is practically impossible to realize the speed control with a high accuracy. More specifically, deviations from the speed command values tend to increase in the case of the V/f control. Besides, the torque control of high accuracy can not be carried out, differing from the vector control. For these reasons, the V/f control is remarkably inferior to the vector control with regard to the accuracy.

Under the circumstances, it is preferred to adopt the V/f control only when a fault occurs in the rotational speed sensor because of insufficient accuracy for use in the normal operation state of the electric car.

The drive recorder described above in conjunction with an aspect of the invention holds the data for the vector control at a time point immediately preceding the detection of abnormality in the rotational speed sensor. Accordingly, by utilizing these data, it is possible to continue the vector control even in the case of absence of the signal from the rotational speed sensor although a time period for such control is limited, whereby the electric car can be driven continuously with safety even after occurrence of a fault in the rotational speed sensor.

Besides, by incorporating the drive recorder, a predicted control may also be made available.

As pointed out previously, the rotational speed sensor is indispensably required for the vector control. On the other hand, a vector control without using the feedback of the output of the rotational speed sensor is also conceivable, according to which the speed command and the torque command are derived through vector conversion of the primary current of the induction motor in consideration of circuit parameters. In principle, with such vector control, the speed and torque control of the induction motor can certainly be performed to allow the electric car to run in a more or less satisfactory manner.

However, the vector control mentioned just above is inferior to the vector control operative on the basis of the feedback speed signal produced by the rotational speed sensor.

In the system proposed according to still another aspect of the invention, the result of the arithmetic determination of the rotational speed (rpm) of the induction motor on the basis of the running speed of the electric car is approximately equivalent to the signal actually obtained from the rotational speed sensor. Accordingly, running of the electric car can be continued for a sufficiently long time with safety by performing the vector control on the basis of the rotational speed determined arithmetically as mentioned above.

In this case, the speed of the induction motor can be arithmetically determined from the car speed while taking into account the reduction gear ratio. However, in consideration of the presence of mechanical clearance in the transmission train and delay involved in the signal processing, the control accuracy is lower when compared with the vector control based on the rotational speed sensor signal. Accordingly, the vector control based on the arithmetically determined rotational speed of the induction motor should preferably be employed as a back-up control facility for coping with occurrence of a fault in the rotational speed sensor.

It is further noted that in the driving system incorporating the inverter, uncontrollable situation can prevail when a fault takes place in the inverter. By way of example, a short-circuit failure, if occurred, leads to an overcurrent state, making the inverter uncontrollable. To deal with this problem, it is proposed according to a further aspect of the invention to disconnect electrically the inverter and the induction motor from each other. In that case, the induction motor is placed in a free-running state with all the electrical forces being cleared, resulting in that the electric car continues to run solely under the force of inertia. In other words, a stable running state of the electric car can be ensured without any fear of influence of abnormal torque.

Thus, the electric can be parked or stopped with security by applying a mechanical brake in the inertial running state even when a fault occurs in the inverter.

A further problem of the driving system using the inverter can be seen in that change in the inverter output in response to a spurious signal such as external disturbances (noise) may erroneously be determined as occurrence of a fault in the inverter, whereby the electric car is unwantedly forced to stop. To dispose of this problem, it is also taught by the present invention that upon detection of spontaneous change in the inverter output, the power supply to the inverter is once interrupted and restarted after lapse of a predetermined short time period (on the order of milliseconds). When the change in the inverter output is due to the spurious signal (i.e., when a temporary abnormality takes place in the inverter), the car operation can be continued normally after the restart. Thus, it is also possible according to the invention to operate the electric car with sufficiently high security even upon occurrence of abnormality of the inverter due to the spurious signal.

As described previously, in a driving system of the type in which a plurality of wheels are driven independently of one another, occurrence of abnormality in one of the plural wheel driving systems brings about a remarkable load unbalance to the other driving systems. By way of example, in the case of a two-wheel driving system, when the output of the induction motor for driving one wheel becomes zero, the torque required by the car for the running thereof must be borne by the induction motor for the other driving wheel. In such situation, the steering of the electric car by means of a steering handle is obstructed due to unbalance between the torques applied, for example, to left and right driving wheels, respectively, making it practically impossible to operate the car safely. This problem can be avoided according to a further aspect of the invention by interrupting the power supply to all the induction motors or driving systems upon detection of occurrence of abnormality in one of the induction motors or driving systems. Thus, the electric car can continue to run under inertia without being affected by the unbalance in torque, whereby freedom of manipulation of the steering handle can be ensured to allow the electric car to run continuously in a stable state.

In that case, the electric car is placed in the free running state. However, the car can be parked safely by actuating the mechanical brake provided conventionally for decelerating the car. Subsequently, the car speed can be lowered to a speed level which is safe for operation with only the driving effort obtained from the induction motor operating normally. Alteratively, the electric car may once be stopped and restarted to continue the running.

Thus, there is provided according to the aspect of the invention described above the facility for allowing the electric car to be decelerated or run safely without falling into an unstable state even upon occurrence of load unbalance brought about by a fault in one of the plural driving systems. The electric car can further be decelerated or stopped or parked safely by actuating the mechanical brake. Of course, it is desirable to decelerate the car to a speed at which it can run safely with only the driving effort of the induction motor or driving system suffering from no fault or alternatively stop once the car and restart it with a low speed in consideration of torque unbalance between the left and right driving wheels.

BRIEF DESCRIPTION OF THE DRAWINGS

FIG. 1 is a block diagram of a control apparatus for a car-onboard induction motor according to an embodiment of the invention applied to an electric car;

FIGS. 2A and 2B are block diagrams showing a modification of a vector control circuit incorporated in the motor control apparatus for an electric car together with major associated component;

DESCRIPTION OF THE PREFERRED EMBODIMENTS

Figure 2B:
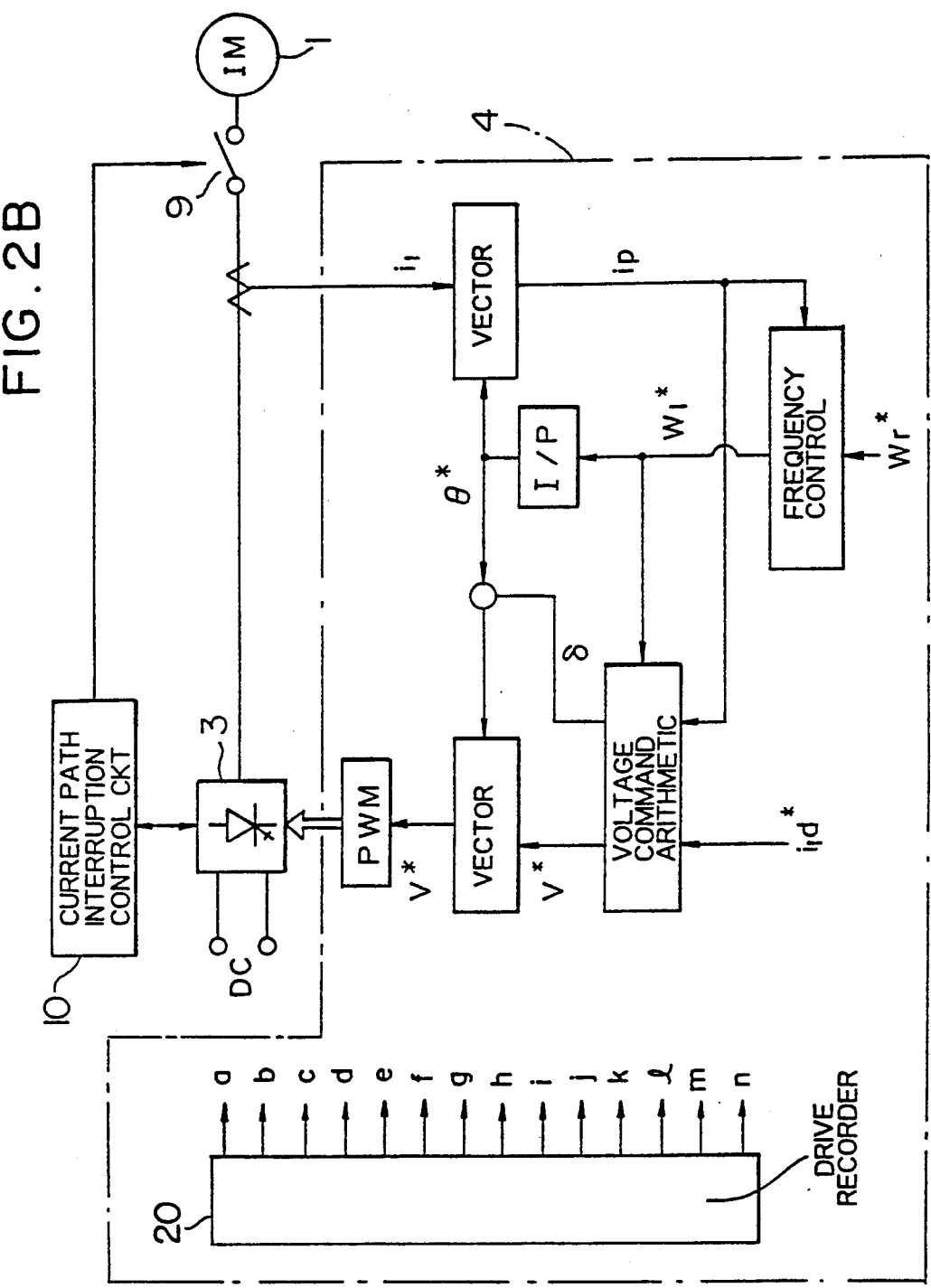

In the following, the control apparatus for an electric car propulsion motor according to the present invention will be described in detail conjunction with preferred or exemplary embodiments thereof by reference to the accompanying drawings.

FIG. 1 is a block diagram of an induction motor control apparatus according to an embodiment of the invention applied to an electric automobile or car, in which a DC power supplied from an on-board battery (not shown) is converted through an inverter into a three-phase AC power to be supplied to an induction motor 1 for propelling the electric car.

For controlling the inverter 3, there are provided two types of control circuits, i.e., a vector control circuit 4 and a V/f control circuit 5 (adapted to perform a voltage/frequency ratio constant control), wherein either one of the signals outputted from these control circuits 4 and 5 is selected by a switching circuit 7 for driving the induction motor 1. Parenthetically, both the vector control circuit 4 and the V/f control circuit 5 may be constituted by those known in the art. Accordingly, any further description of these circuits will be unnecessary.

The vector control circuit 4 has an input terminal to which an output signal of a rotational speed sensor 2 coupled to an output shaft of the induction motor 1 is applied. Thus, when the output signal of the vector control circuit 4 is selected by the change-over circuit 7, the inverter 3 is operated under the vector control realized by feeding back a signal representing a rotational speed (rpm) produced by the rotational speed sensor 2, whereby the induction motor 1 is controlled in accordance with a speed command and others supplied from an electric car control circuit 6.

The car control circuit 6 has inputs supplied with an acceleration signal generated by actuating an accelerator pedal, a brake signal generated by depressing a brake pedal and the like, to thereby produce a variety of commands such as the speed command and the like. The various commands issued by the car control circuit 6 are supplied not only to the vector control circuit 4 but also to be V/f control circuit 5.

On the other hand, the output signal of the rotational speed sensor 2 is supplied to an abnormality detecting circuit 8 as well, which monitors constantly the output signal of the rotational speed sensor 2 for generating an abnormal signal upon occurrence of abnormality in the output signal of the rotational speed sensor 2 such as occurrence of zero level due to wire breakage or infinity level due to short-circuit. The abnormality signal is then supplied to the change-over circuit 7.

As described above, the change-over circuit 7 serves to select either the vector control circuit 4 or the V/f control circuit 5 for supplying the control signal to the inverter 3. More particularly, so long as no abnormality signal is supplied from the abnormality detecting circuit 8, the change-over circuit 7 supplies to the inverter 3 the control signal from the vector control circuit 4, while upon reception of the abnormality signal, the change-over circuit 7 selects the V/f control circuit 5 for supplying the control signal to the inverter 3.

Next, operation of the control apparatus implemented in the structure shown in FIG. 1 will be described.

In the normal operating state of the rotational speed sensor 2, no abnormality signal is issued by the abnormality detecting circuit 8. Accordingly, the control signal outputted from the vector control circuit 4 is supplied to the inverter 3.

Thus, the inverter 3 is placed in the vector control mode realized by making use of the output signal from the rotational speed sensor 2 as the feedback signal, whereby the induction motor 1 is controlled with high accuracy in response to the commands issued by the electric car control circuit 6. As a result of this, the running state of the electric car can be controlled properly and accurately.

On the other hand, in case an abnormality occurs in the rotational speed sensor 2 for some reason, an abnormality signal is then outputted from the abnormality detection circuit 8, which results in that the control signal for the inverter 3 is changed over from the signal outputted from the vector control circuit 4 to the signal outputted from the V/f control circuit 5.

At this time, the inverter 3 is placed in the V/f mode in which the inverter 3 is controlled by the control signal outputted from the V/f control circuit 5, whereby the speed control of the induction motor 1 in response to the commands issued by the car control circuit 6 is effectuated to allow the electric car to run continuously regardless of occurrence of abnormality in the rotational speed sensor.

Provided in the current supply path extending from the inverter 3 to the induction motor 1 is an interruption switch SW9 in combination with a current path interruption control circuit 10 which is adapted to monitor the operation of the inverter 3. More specifically, the current path interruption control circuit 10 is designed to detect such abnormal inverter states as the absence of one of three phase outputs of the inverter, appearance of voltage across SCR terminals notwithstanding of ON state of the gate signal of the SCR and the like events.

By virtue of the arrangement described just above, any abnormal current due to the erroneous operation of the inverter can be detected by the current path interruption control circuit 10 which then opens the disconnecting switch SW9, whereby supply of the abnormal current to the induction motor can positively be interrupted.

It is further noted that there may arise such a situation in which a spurious signal is admixed to the control signal supplied to the inverter 3 due to external disturbance (such as noise), whereby the output of the inverter 3 becomes temporarily abnormal. To cope with this problem, such arrangement may also be adopted that after opening the disconnecting switch SW9 once upon detection of abnormality of the inverter 3 by the current path interruption control circuit 10, the switch SW9 is again closed after lapse of a short time. With this configuration, the normal driving state can rapidly be restored even when a spurious signal is admixed due to external disturbance.

As will now be understood from the foregoing, with the embodiment of the induction motor control apparatus for an electric car described above, there can be suppressed to a maximum the unwanted possibility of the electric car falling in the running disabled state as well as the dangerous state of the induction motor 1 becoming uncontrollable even when abnormality occurs in the rotational speed sensor 2 or when abnormality takes place in the operation of the inverter 3 or when a spurious signal is admixed to the control signal for the inverter. Thus, with the control apparatus, safety can always be assured for the operation of the electric car.

Next, description will be made of another embodiment of the invention by reference to FIGS. 2A and 2B.

More specifically, FIGS. 2A and 2B are block diagrams showing a modification of the vector control circuit of the induction motor control apparatus for an electric car together with major associated components, wherein FIG. 2A shows the same in a normal state in which no abnormality is detected in the rotational speed sensor 2 while FIG. 2B shows the state to which the induction motor control apparatus is changed over upon occurrence of abnormality in the rotational speed sensor 2. In these figures, a reference numeral 9 denotes a disconnecting switch shown as SW9 in FIG. 1, which is operated by the current path interruption control circuit 10 upon occurrence of abnormality in the inverter 3 to thereby disconnect the inverter 1 from the induction motor 1.

A reference numeral 20 denotes a drive recorder incorporated in the vector control circuit 4. So long as the electric car runs normally with the induction motor therefor being placed under the vector control based on the signal outputted from the rotational speed sensor 2 operating normally, i.e., when the state shown in FIG. 2A prevails, the drive recorder 20 fetches state data a, b, ..., m, n from individual components and constantly updates these data successively to thereby hold the latest data, while in the abnormal state shown in FIG. 2B, the drive recorder 4 outputs the data a, b, ..., m, n which have been fetched and recorded in the normal state.

At first, the normal state shown in FIG. 2A will be considered. In this state, the induction motor 1 undergoes a speed control and a torque control through the vector control of the inverter 3 by feeding back the output of the rotational speed sensor 2. Consequently, the rotational speed and the torque of the induction motor 1 can be controlled in response to the commands inputted from the electric car control circuit (not shown in this figure) with sufficiently high accuracy to ensure a proper and reliable control of the electric car in running.

When abnormality occurs in the rotational speed sensor 2, the circuit state shown in FIG. 2A is changed over to the state shown in FIG. 2B by means of a change-over circuit (not shown in this figure).

In the circuit state shown in FIG. 2B, the vector control in which the output signal of the rotational speed sensor 2 (not shown) is not used is validated. In this case, as the initial value for the vector control, the data a, b, . . . , m, n stored in the drive recorder 10 are supplied, whereafter the vector control of the inverter 3 is effectuated by utilizing these data. In this way, when the vector control circuit 4 shown in FIG. 1 is implemented in the configuration shown in FIGS. 2A and 2B, the abnormality detecting circuit 8 is set to the OFF state while change-over to the V/f control circuit 5 by the change-over circuit 7 is disabled.

As will now be apparent, with the configuration of the inverter control circuit shown in FIGS. 2A and 2B, there can be realized the control of the induction motor 1 in a sufficiently continuous state to ensure constantly the running of the electric car with high accuracy and high safety.

Parenthetically, the vector control operation of the circuit shown in FIGS. 2A and 2B is known in the art. Accordingly, any further description thereof is omitted.

It will now be understood that according to the embodiment shown in FIGS. 2A and 3B, rapid transition is made to the vector control mode which is not based on the feedback of the output signal of the rotational speed sensor 2, when occurrence of abnormality in the rotational speed sensor 2 is detected, whereby the running state of the electric car can be controlled safely with a relatively high accuracy while allowing the electric car to run continuously.

Such a version of the embodiment shown in FIGS. 2A and 2B is conceivable in which an abnormality detecting circuit (not shown) is provided for detecting occurrence of abnormality in the inverter system including the rotational speed sensor 2 and the control circuit 4 to thereby open the switch 9 upon occurrence of any abnormal signal.

Thus, with the arrangement described above, the switch 9 is opened upon occurrence of abnormality in the inverter 3 including the rotational speed sensor 2 and the control circuit, whereby the induction motor 1 is automatically disconnected from the inverter to be placed in the free running state.

According to the version of the embodiment shown in FIGS. 2A and 2B described just above, the electric car can be operated safely by actuating a mechanical brake system 14 provided in association with rear wheels, when abnormality takes place in the inverter 3 inclusive of the rotational speed sensor 2 and the control circuit, whereby sufficiently high security or safety can be afforded.

A further embodiment of the present invention will be described by reference to FIG. 3.

In this figure, a reference numeral 11 generally denotes an electric driving power system including a DC battery, an inverter 3, a vector control circuit 4, an electric car control circuit 6 and an abnormality detection/change-over circuit 16. With this driving power system, the induction motor 1 is driven by the inverter 3 in the vector control mode by using the output signal of the rotational speed sensor 2, wherein the output of the induction motor 1 is transmitted to wheels 13 through a transmission gear train 12 to thereby run the electric car. In FIG. 3, a reference numeral 14 denotes a brake system, a numeral 15 denotes a wheel speed sensor and a numeral 17 denotes a scaler arithmetic for converting the detected value of the sensor 15 to the rotational number or speed (rpm) of the induction motor 1.

Figure 3:
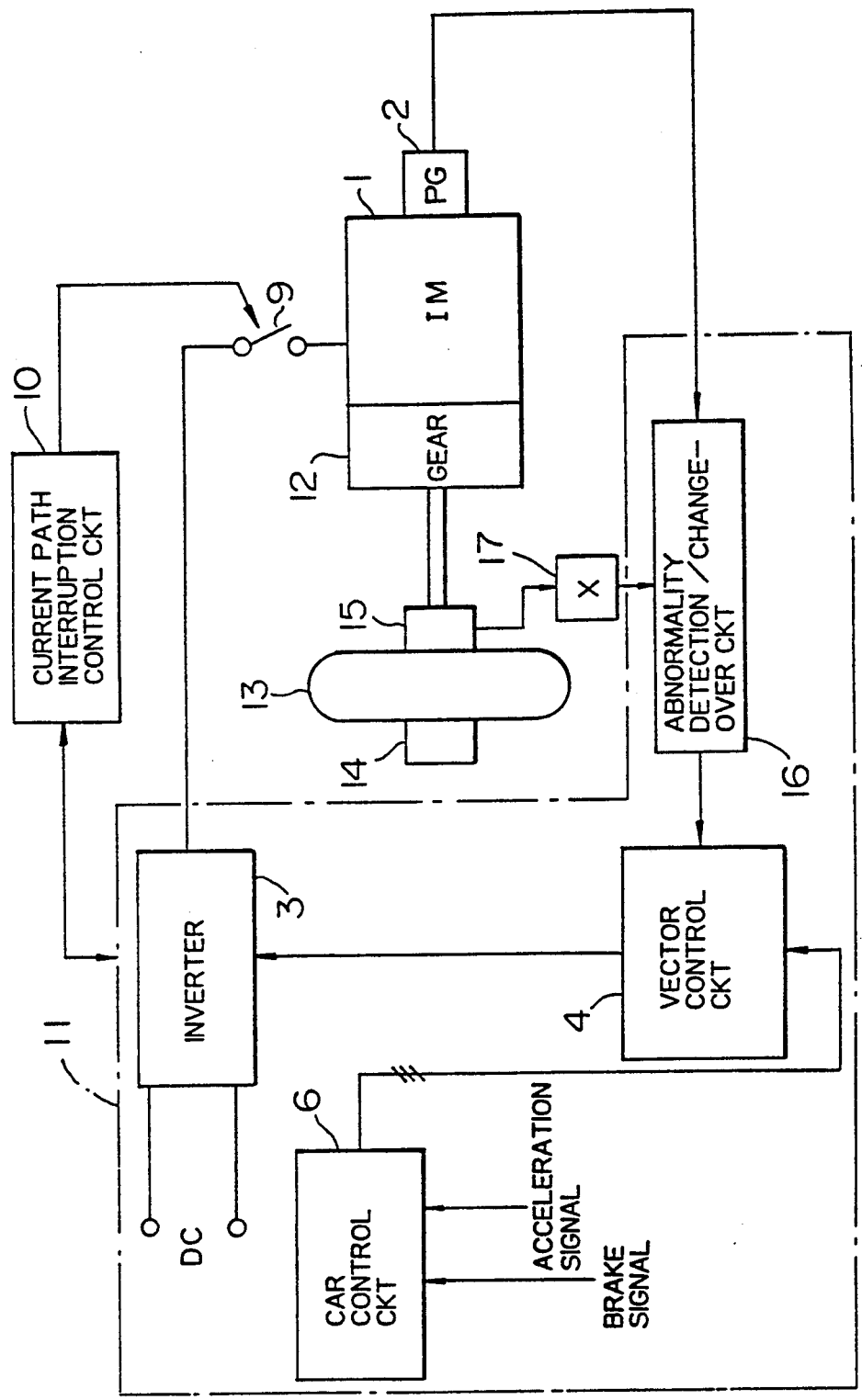
FIG. 3 is a block diagram showing a structure of the control apparatus according to another embodiment of the invention.

With the arrangement shown in FIG. 3, operation of the electric car can be controlled with high accuracy by controlling the speed and torque of the induction motor 1 through the vector control by feeding back the output signal of the rotational speed sensor 2 so long as no abnormality is detected in the rotational speed sensor 2.

On the other hand, when abnormality is detected in the rotational speed sensor 2, the abnormality detection/change-over circuit 16 uses as the feedback signal the output signal of the wheel speed sensor 15 in place of the rotational speed sensor signal. Thus, the vector control can be maintained effective in a continuous manner even upon occurrence of abnormality in the rotational speed sensor signal.

In the system such as shown in FIG. 3 where the output power of the induction motor 1 is transmitted to the wheels through the transmission gear train 12, a product obtained by multiplying the output signal of the wheel speed sensor 15 by a reduction ratio of the reduction gear train 12 represents the rotational speed of the induction motor 1. Accordingly, in the case of the instant embodiment now under consideration, a predetermined arithmetic processing is performed on the output signal of the wheel speed sensor 15 by the scaler arithmetic 17 to thereby derive a signal equivalent to the output signal of the rotational speed sensor 2, wherein the equivalent signal is utilized as the feedback signal required for the vector control.

It should also be mentioned that in the case of the embodiment, such arrangement may also be adopted in which abnormality in the electric driving power system 11 is detected to thereby open the disconnecter ageous effects as those mentioned hereinbefore in conjunction with the embodiment shown in FIGS. 2A and 2B.

Further, it will readily be appreciated in conjunction with the embodiments described above by reference to FIGS. 2A, 2B and FIG. 3 that upon occurrence of an abnormality signal as described above, the switch 9 once opened to disconnect electrically the induction motor 1 from the inverter 3 or the electric driving power system can again be closed immediately after the opening.

In this case, when abnormality is no more hanger detected after closing the switch 9, the abnormality detected before opening thereof is decided to be of temporary nature such as a noise-ascribable abnormality, whereby the electric car is allowed to run continuously. To the contrary, if the abnormality is still observed after the closing of the switch 9, this means a failure or fault in the intrinsic sense. Accordingly, the switch 9 is opened once again to thereby stop the operation of the electric car.

In the apparatus such as the inverter control apparatus in which a large number of semiconductor elements are used, a temporary abnormal state due to external disturbance such as noise is likely to occur frequently. In that case, the apparatus assumes the same state as that prevailing upon occurrence of a fault in the intrinsic sense. When the abnormality is of temporary nature, the apparatus can resume the normal state by once turning off the power supply. For this reason, the embodiment described above is advantageous in that the unwanted possibility of the electric car becoming inoperable due to erroneous operation brought about by noise can be suppressed, assuring thus a high reliability.

A further embodiment of the present invention will be described by reference to FIG. 4.

The instant embodiment is applied to a two-wheel driving type electric car of those having a plurality of wheels adapted to be driven independently from one another.

Figure 4:
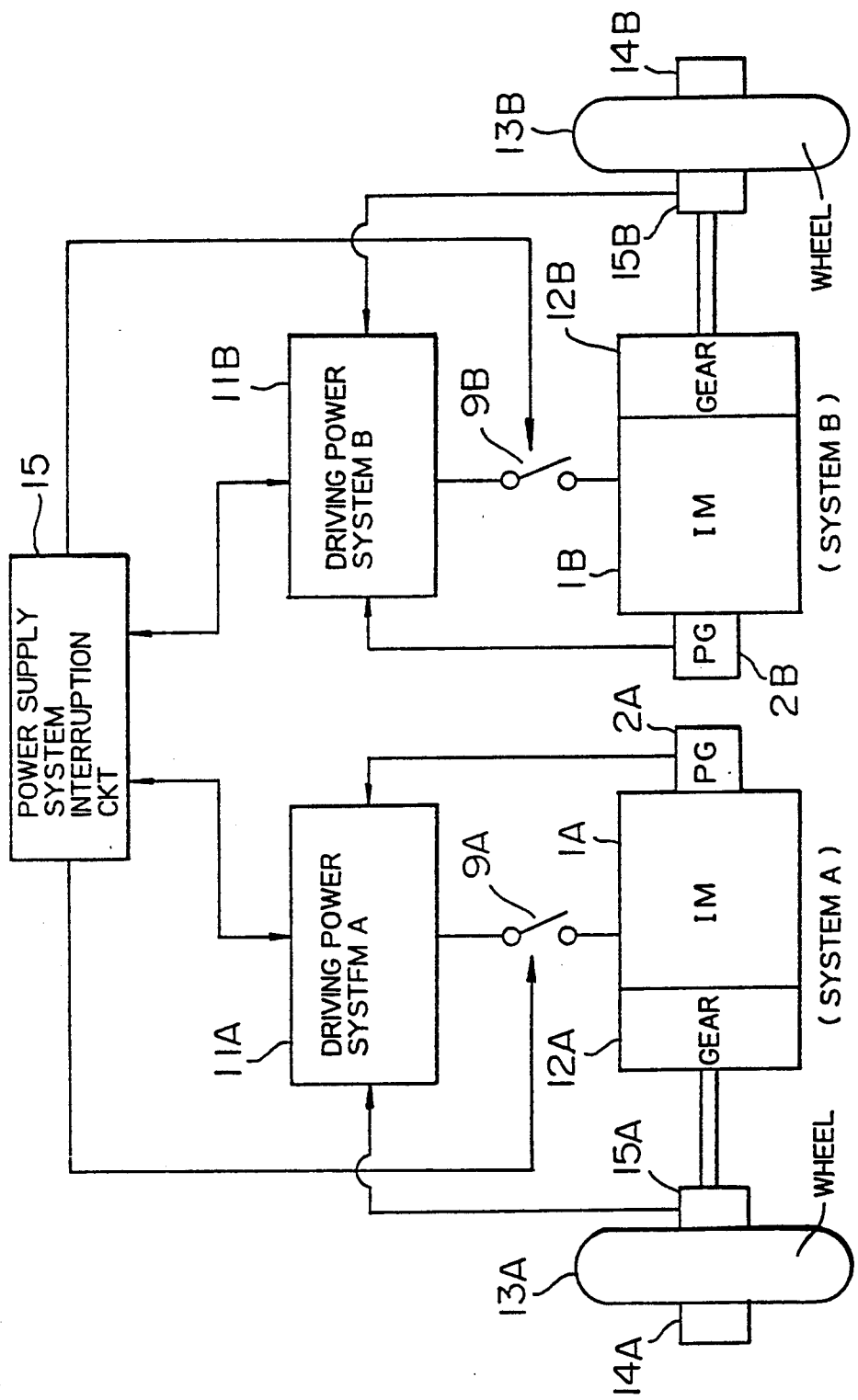
FIG. 4 is a block diagram showing a structure of the control apparatus according to a further embodiment of the invention.

In FIG. 4, components of one driving system are denoted by reference numerals attached with a suffix A with those of the other driving system being affixed with B. Except for this difference, denotation is same as in FIG. 3.

Now referring to FIG. 4, there is provided a two-system monitoring/power interruption system 15 which is designed to generate an abnormality detection signal upon detection of abnormality in the rotational speed sensor 2A and the electric driving power system 11A as well as in the rotational speed sensor 2B and the electric driving power system 11B.

Assuming now that abnormality takes place in one electric driving power system such as the system 11A, both switches 9A and 9B are simultaneously opened by the circuit 15 to thereby interrupt once the power supply to the induction motors 1A and 1B driving all the wheels 13A and 13B. In this state, the mechanical brake systems 8A and 8B are operated to thereby lower the speed of the electric car to a level at which the car can run safely with only the induction motor, say, 1B belonging to the normal electric driving power system, say, the electric power driving system 11 or alternatively stop the induction motor, whereafter only the switch 9B is closed again to restart the induction motor 1B. Thereafter, operation of the electric car is continued at a low speed with only the driving system B. The power interruption circuit 15 may be so implemented as to interrupt only the electric driving system decided to be abnormal instead of interrupting the two driving systems.

In general, in the electric car equipped with a plurality of driving systems, the probability of simultaneous occurrence of abnormality in the plural systems is considerably low. With the arrangement according to the instant embodiment, it is possible to run the electric car substantially invariably even when abnormality takes place in one of the plural electric driving power systems. In other words, safety or security can adequately be ensured.

It goes without saying that the concept of the invention incarnated in the embodiment shown in FIG. 4 and applied to the two-wheel drive type electric car can equally be adopted in the four-wheel drive type automobile.

As can be appreciated from the foregoing, it is possible in the electric car driving system adopting the vector control to stop or run continuously the electric car with improved security even upon occurrence of a fault in the rotational speed sensor.

Further, in the electric car driving system powered by the inverter, the car can be stopped with improved or high security upon occurrence of a fault in the inverter.

Besides, in the inverter-driven type electric car driving system, the electric car is able to run continuously without being unnecessarily stopped in response to a spurious signal similar to the signal indicating a fault in the inverter or others.

Additionally, in an electric car driving system for driving a plurality of wheels independent of one another, the electric car can selectively be stopped or run continuously even upon occurrence of abnormality in one of the driving systems.

What is claimed is:

1. A control apparatus for an induction motor, comprising:
    an inverter for supplying a drive current to said induction motor on the basis of a predetermined control signal;
    a rotational speed sensor for detecting a rotational speed of said induction motor;
    a V/f control circuit for generating a control signal for said inverter in response to a predetermined speed command inputted to said V/f control circuit;
    a vector control circuit for generating a control signal for said inverter on the basis of said speed command signal and a rotational speed signal supplied from said rotational speed sensor;
    an abnormality detecting circuit having an input supplied with an output signal of said rotational speed sensor for detecting abnormality of said rotational speed sensor; and
    a change-over circuit having inputs supplied with the output signals of said V/f control circuit and said vector control circuit, respectively, for selecting the control signal from said V/f control circuit when abnormality of said rotational speed sensor is detected by said abnormality detection circuit, while selecting the control signal from said vector control circuit when no abnormality is detected in said rotational speed sensor, said selected control signal being output to said inverter.

2. A control apparatus for an induction motor according to claim 1, further comprising:
    a current path interrupting switch provided in a power supply current path extending from said inverter to said induction motor; and
    a current path interruption control circuit for opening said current path interrupting switch upon detection of abnormal operation of said inverter.

3. A control apparatus for an induction motor according to claim 1, said abnormality detecting circuit includes storage means for storing predetermined data of said vector control circuit and updating successively said data so long as said vector control circuit generates the control signal on the basis of the output of said rotational speed sensor, wherein upon detection of abnormality of the output of said rotational speed sensor, a control signal for said inverter is generated on the basis of the latest data stored in said storage means.

4. A control apparatus for an induction motor according to claim 3, further comprising:
    a current path interrupting switch provided in a power supply current path extending from said inverter to said induction motor; and
    a current path interrupting control circuit for opening said current path interrupting switch upon detection of abnormal operation of said inverter.

5. A control apparatus for an induction motor for propelling a motor vehicle, comprising:
    an inverter for driving said induction motor;
    a rotational speed sensor for detecting a rotational speed of said induction motor;
    a vector control circuit for generating a control signal of said inverter on the basis of a predetermined speed command and a rotational speed signal representing rotational speed of said induction motor and supplied from said rotational speed sensor;

a vehicle speed sensor for detecting a speed of said motor vehicle;

arithmetic means for arithmetically determining a rotational speed of said induction motor on the basis of a detection signal outputted from said vehicle speed sensor; and an abnormality detection/change-over circuit having inputs supplied with output signals from said rotational speed sensor and said arithmetic means, respectively, for selecting the output signal from said arithmetic means when the output of said rotational speed sensor is abnormal while selecting the output signal of said rotational speed sensor when the output of said rotational speed sensor is normal, said selected signal being supplied to said vector control circuit.

6. A control apparatus for an induction motor for propelling a motor vehicle according to claim 5, further comprising:

a current path interrupting switch provided in a power supply current path extending from said inverter to said induction motor; and a current path interruption control circuit for opening said current path interrupting switch upon detection of abnormal operation of said inverter.

7. A control apparatus for an induction motor for propelling a motor vehicle according to claim 5, wherein upon detection of abnormality in said inverter, said current path interruption control circuit opens once said current path interrupting switch and closes again said current path interrupting switch after lapse of a predetermined time from the opening of said current path interrupting switch.

8. A control apparatus for an induction motor for propelling a motor vehicle, comprising:

a plurality of wheel driving induction motors provided for driving predetermined wheels of said motor vehicle independent of one another;

a plurality of electric driving power control apparatus provided independent of one another for said plurality of wheel driving induction motors, respectively;

power supply line interrupting means provided in power supply lines extending from said wheel driving power control apparatuses to said wheel driving induction motors, respectively; and a power supply interrupting circuit responsive to detection of abnormality in any one of said plural driving power control apparatuses for opening the power supply interrupting means provided in a power supply line for supplying an electric driving power to the wheel driving induction motor corresponding at least to one of said plural driving power control apparatuses which suffers from said abnormality as detected.

9. A control apparatus for an induction motor for propelling a motor vehicle according to claim 8, wherein upon detection of abnormality in any one of said driving power control apparatuses, said power supply interrupting circuit opens once all of said power supply line interrupting means provided in association with all of said driving power control apparatuses and closes again after lapse of a predetermined time the power supply line interrupting means provided in association with those of the driving power supply circuits which suffer from no abnormality.

10. A method for controlling an induction motor, comprising:

supplying a drive current to said induction motor from an inverter on the basis of a predetermined control signal;

detecting a rotational speed of said induction motor from a rotational speed sensor;

generating a control signal for said inverter from a V/f control circuit in response to a predetermined speed command inputted to said V/f control circuit;

generating a control signal for said inverter from a vector control circuit on the basis of said speed command signal and a rotational speed signal supplied from said rotational speed sensor;

detecting abnormality of said rotational speed sensor from an abnormality detecting circuit having an input supplied with an output signal of said rotational speed sensor; and selecting the control signal, using a change-over circuit having inputs supplied with the output signals of said V/f control circuit and said vector control circuit, respectively, from said V/f control circuit when abnormality of said rotational speed sensor is detected by said abnormality detection circuit, while selecting the control signal from said vector control circuit when no abnormality is detected in said rotational speed sensor and outputting said selected control signal to said inverter.

11. A method according to claim 1, further comprising the step of opening a current path interrupting switch upon detection of abnormal operation of said inverter using a current path interruption control circuit, said current path interrupting switch being provided in a power supply current path extending from said inverter to said induction motor.

12. A method according to claim 1, further comprising the steps of:

storing predetermined data of said vector control circuits in a storage means in said abnormality detecting circuit; and updating successively said data so long as said vector control circuit generates the control signal on the basis of the output of said rotational speed sensor, wherein upon detection of abnormality of the output of said rotational speed sensor, a control signal for said inverter is generated on the basis of the latest data stored in said storage means.

13. A method according to claim 12, further comprising the step of opening a current path interrupting switch upon detection of abnormal operation of said inverter using a current path interruption control circuit, said current path interrupting switch being provided in a power supply current path extending from said inverter to said induction motor.

14. A control apparatus for an induction motor of an electric motor vehicle, comprising:

an inverter for supplying a drive current to said induction motor on an electric motor vehicle on the basis of a predetermined control signal;

a rotational speed sensor for detecting a rotational speed of said induction motor of an electric vehicle;

a V/f control circuit for generating a control signal for said inverter in response to a predetermined speed command input to said V/f control circuit;

a vector control circuit for generating a control signal for said inverter on the basis of said speed command signal and a rotational speed signal supplied from said rotational speed sensor;

an abnormality detecting circuit having an input supplied with an output signal of said rotational speed sensor for detecting abnormality of said rotational speed sensor; and a change-over circuit having inputs supplied with the output signals of said V/f control circuit and said vector control circuit, respectively, for selecting the control signal from said V/f control circuit when abnormality of said rotational speed sensor is detected by said abnormality detection circuit, while selecting the control signal from said vector control circuit when no abnormality is detected in said rotational speed sensor, said selected control signal being output to said inverter.

* * * * *